United States Patent
Hogan et al.

(10) Patent No.: US 10,427,395 B2
(45) Date of Patent: Oct. 1, 2019

(54) METHOD OF MAKING VACUUM INSULATED GLASS (VIG) WINDOW UNIT INCLUDING ACTIVATING GETTER

(71) Applicant: Guardian Glass, LLC, Auburn Hills, MI (US)

(72) Inventors: John P. Hogan, Northville, MI (US); Andrew W. Pantke, Belleville, MI (US); Rudolph H. Petrmichl, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 0 days.

(21) Appl. No.: 16/269,764

(22) Filed: Feb. 7, 2019

(65) Prior Publication Data

US 2019/0168496 A1    Jun. 6, 2019

Related U.S. Application Data

(63) Continuation of application No. 15/691,783, filed on Aug. 31, 2017, now Pat. No. 10,207,486, which is a (Continued)

(51) Int. Cl.
*B32B 37/14*    (2006.01)
*B32B 37/10*    (2006.01)
(Continued)

(52) U.S. Cl.
CPC ............. *B32B 37/14* (2013.01); *B32B 37/10* (2013.01); *E06B 3/6612* (2013.01);
(Continued)

(58) Field of Classification Search
CPC ....................................................... B32B 37/14
See application file for complete search history.

(56) References Cited

U.S. PATENT DOCUMENTS 6,420,002 B1    7/2002   Aggas
6,497,931 B1    12/2002  Aggas
(Continued)

FOREIGN PATENT DOCUMENTS

EP    0 757 920    2/1997
EP    1 439 152    7/2004
(Continued)

OTHER PUBLICATIONS

U.S. Appl. No. 15/691,783, filed Aug. 31, 2017; Hogan et al.
(Continued)

*Primary Examiner* — Daniel H Lee

(57) ABSTRACT

Methods of making vacuum insulated glass (VIG) window units are provided, including activating getters in a process of making VIG window units. In certain example embodiments, at least one getter is activated during and/or at the end of a pump-out/evacuation process in which the cavity between the substrates is evacuated. In certain example embodiments, the getter(s) may be activated (e.g., by at least a laser beam that is directed through a pump-out tube) during and/or at the end of the evacuation process in which the cavity between the substrates is evacuated to a low pressure that is below atmospheric pressure.

8 Claims, 3 Drawing Sheets

Related U.S. Application Data continuation of application No. 15/064,001, filed on Mar. 8, 2016, now Pat. No. 9,764,538, which is a continuation of application No. 13/562,408, filed on Jul. 31, 2012, now Pat. No. 9,290,984.

(51) Int. Cl.
  *E06B 3/66* (2006.01)
  *E06B 3/677* (2006.01)

(52) U.S. Cl.
  CPC ............ *E06B 3/6775* (2013.01); *Y02A 30/25* (2018.01); *Y02B 80/24* (2013.01)

(56) References Cited

U.S. PATENT DOCUMENTS

| | | |
|---|---|---|
| 6,514,430 B1 | 2/2003 | Corazza et al. |
| 6,558,494 B1 | 5/2003 | Wang et al. |
| 6,692,600 B2 | 2/2004 | Veerasamy |
| 7,115,308 B2 | 10/2006 | Amari et al. |
| 8,137,494 B2 | 3/2012 | Cooper et al. |
| 8,227,055 B2 | 7/2012 | Wang |
| 9,290,984 B2 | 3/2016 | Hogan et al. |
| 9,764,538 B2 | 9/2017 | Hogan et al. |
| 10,207,486 B2 | 2/2019 | Hogan et al. |
| 2003/0001499 A1 | 1/2003 | Kim |
| 2003/0051436 A1* | 3/2003 | Veerasamy ........... E06B 3/6612 52/786.1 |
| 2004/0104675 A1 | 6/2004 | Martelli |
| 2004/0253395 A1* | 12/2004 | Amari .................... C03C 27/06 428/34 |
| 2011/0234091 A1 | 9/2011 | Yoshitake et al. |

FOREIGN PATENT DOCUMENTS

| | | |
|---|---|---|
| JP | H05-501896 A | 4/1993 |
| JP | 2004-149343 | 5/2004 |
| JP | 2004-152530 | 5/2004 |
| WO | WO 91/02878 | 3/1991 |
| WO | WO 97/29503 | 8/1997 |
| WO | WO 01/12942 | 2/2001 |
| WO | WO 2004/039741 | 5/2004 |
| WO | WO 2004/039742 | 5/2004 |
| WO | WO 2011/072646 | 6/2011 |

OTHER PUBLICATIONS

U.S. Appl. No. 15/064,001, filed Mar. 8, 2016; Hogan et al.
U.S. Appl. No. 13/562,408, filed Jul. 31, 2012; Hogan et al.
Definition of Length, Retrieved online. www.merriam-webster.com/dictionary/length.
U.S. Appl. No. 13/562,386, filed Jul. 31, 2012; Petrmichl et al.
U.S. Appl. No. 13/562,423, filed Jul. 31, 2012; Petrmichl et al.

\* cited by examiner

METHOD OF MAKING VACUUM INSULATED GLASS (VIG) WINDOW UNIT INCLUDING ACTIVATING GETTER

This application is a continuation of application Ser. No. 15/691,783, filed Aug. 31, 2017 (now U.S. Pat No. 10,207,486), which is a continuation of application Ser. No. 15/064,001, filed Mar. 8, 2016 (now U.S. Pat No. 9,764,538), which is a continuation of application Ser. No. 13/562,408, filed Jul. 31, 2012 (now U.S. Pat. 9,290,984), the entire disclosures of which are hereby incorporated herein by reference in this application.

This disclosure relates generally to vacuum insulated glass (VIG) window unit configurations and methods for making VIG window units. The disclosure more particularly relates to techniques for activating getters in a process of making VIG window units. In certain example embodiments, at least one getter is activated during and/or at the end of a pump-out process in which the cavity between the substrates is evacuated (e.g., pumped-down). Getters are typically subdivided into two main classes: evaporable getters (EGs) and non-evaporable getters (NEGs). While this disclosure is applicable to both EG and NEG type getters, it is particularly useful for getters including NEG type getter material which tend to have a lower activation temperature(s).

BACKGROUND AND SUMMARY OF EXAMPLE EMBODIMENTS

Vacuum insulating glass (VIG) window units typically include at least two spaced apart glass substrates that enclose an evacuated low-pressure space/cavity therebetween. The substrates are interconnected by a peripheral edge seal and typically include spacers between the glass substrates to maintain spacing between the glass substrates and to avoid collapse of the glass substrates that may be caused due to the low pressure evacuated environment that exists between the substrates. Some example VIG configurations are disclosed, for example, in U.S. Pat. Nos. 5,657,607, 5,664,395, 5,657,607, 5,902,652, 6,506,472 and 6,383,580 the disclosures of which are all hereby incorporated by reference herein in their entireties.

FIGS. 1 and 2 illustrate a conventional VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2, 3 are interconnected by a peripheral edge seal 4 which may be made of fused solder glass, for example. An array of support pillars/spacers 5 may be included between the glass substrates 2, 3 to maintain the spacing of glass substrates 2, 3 of the VIG unit 1 in view of the low-pressure space/gap 6 present between the substrates 2, 3.

A pump-out tube 8 may be hermetically sealed by, for example, solder glass 9 to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate (e.g., pump-down) the interior cavity 6 to a low pressure that is less than atmospheric pressure. After evacuation of the cavity 6, a portion (e.g., the tip) of the tube 8 is melted to seal the vacuum in low pressure cavity/space 6. The optional recess 11 may retain the sealed pump-out tube 8.

As shown in FIGS. 1-2, a getter 12 may be included within a recess 13 that is disposed in an interior face of one of the glass substrates, e.g., glass substrate 2. The getter 12 may be used to absorb and/or bind with certain residual impurities that may remain after the cavity 6 is evacuated and sealed. The getter is of or includes a mixture of metals that can react with gas(es) to hold gas(es) impurities to the gettering surface and/or dissolve such gas(es).

Disclosed herein are techniques for activating getters in a process of making VIG window units. In certain example embodiments, at least one getter is activated during and/or at the end of a pump-out process in which the cavity between the substrates is evacuated.

In certain example embodiments of this invention, there is provided a method of making a vacuum insulated glass (VIG) window unit, the method comprising: having first and second substantially parallel glass substrates, a plurality of spacers and a seal provided between the first and second substrates, a cavity to be evacuated to a pressure less than atmospheric pressure located between the glass substrates, and at least one getter provided in the cavity; and activating the getter during and/or substantially at an end of an evacuation process in which the cavity is evacuated to a pressure less than atmospheric pressure.

In certain example embodiments of this invention, there is provided a method of making a vacuum insulated glass (VIG) window unit, the method comprising: having first and second substantially parallel glass substrates, an array of spacers and a seal provided between the first and second substrates, and a cavity to be evacuated to a pressure less than atmospheric pressure located between the glass substrates, and a getter supported by the first substrate; and directing a laser beam through a pump-out tube supported by the second substrate so that the laser beam impinges upon the getter and activates the getter.

These and other embodiments and advantages are described herein with respect to certain example embodiments and with reference to the following drawings in which like reference numerals refer to like elements throughout the several views, and wherein:

DETAILED DESCRIPTION OF EXAMPLE EMBODIMENTS

Figure 2:
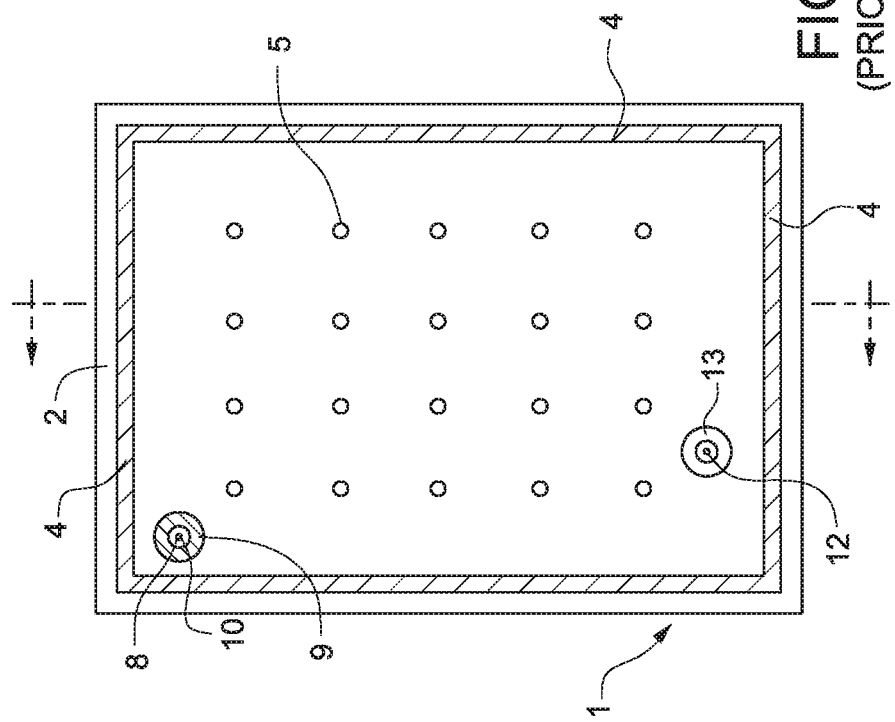
FIG. 2 is a top plan view of the conventional VIG unit of FIG. 1.
Figure 1:
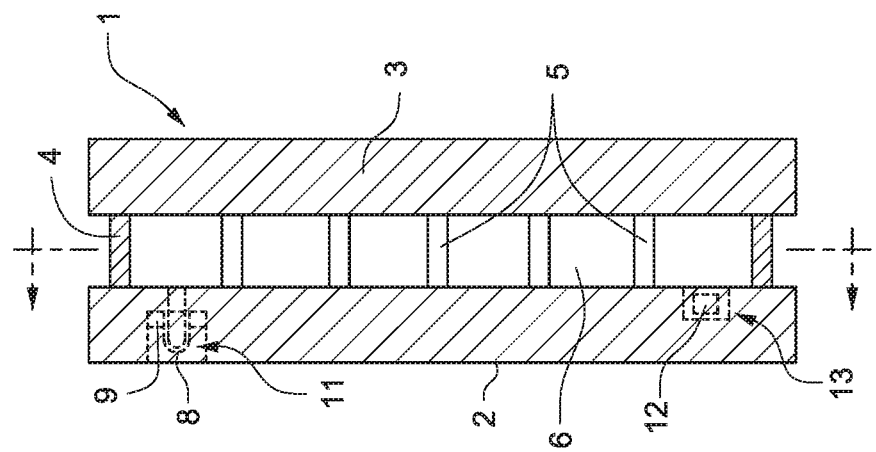
FIG. 1 is a cross sectional schematic diagram of a conventional VIG unit.

Certain example embodiments will be described in detail herein with reference to the foregoing drawings in which like reference numerals refer to like elements throughout the several views. It will be understood that the embodiments described herein are intended to be illustrative, not limiting, and that those skilled in the art will understand that various modifications may be made without departing from the true spirit and full scope of the claims appended hereto.

Figure 3:
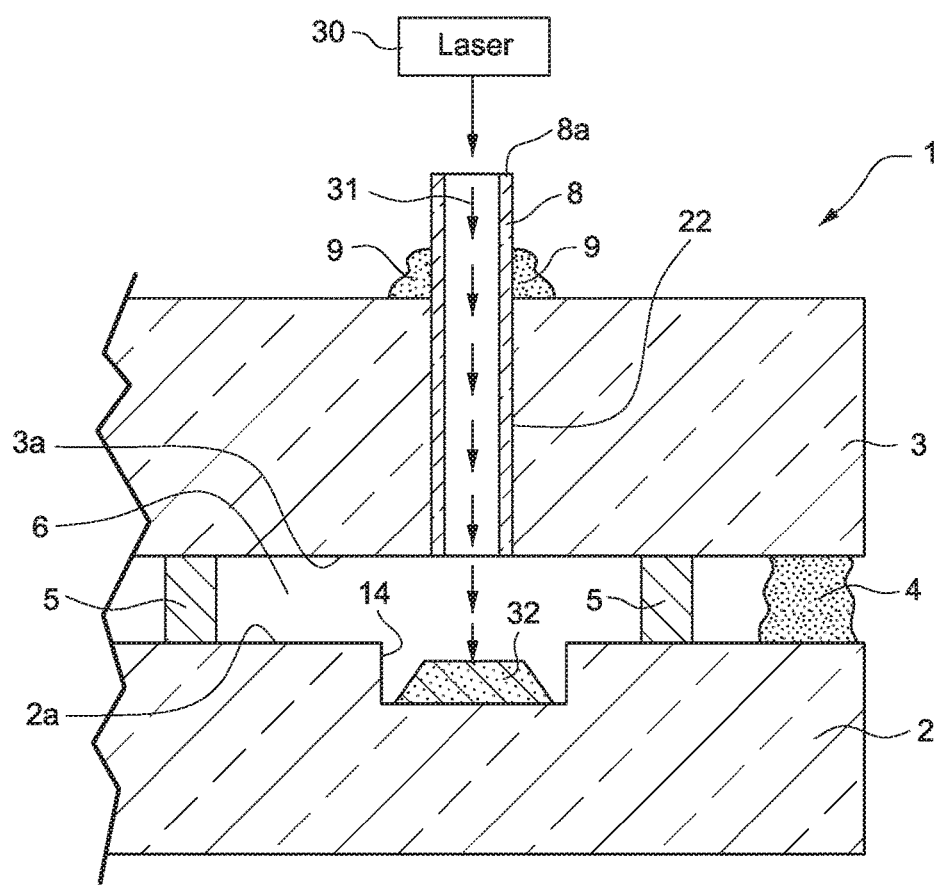
FIG. 3 is a schematic partial cross sectional diagram illustrating an example VIG window unit and a technique for activating a getter according to an example embodiment of this invention.

With reference to FIG. 3, a schematic cross sectional view of an example VIG window unit 1 is illustrated. VIG window units 1 may be used, for example, and without limitation, as windows in residential homes, office buildings, apartment buildings, doors, and/or the like. The VIG window unit 1 includes spaced apart first and second transparent and substantially parallel glass substrates 2, 3 that may be interconnected by an edge seal 4, which may, for example, and without limitation, be of or include a vanadium based or VBZ type seal or a solder glass type seal. Example vanadium based or VBZ type seal compositions are disclosed in U.S. patent application Ser. No. 13/354,963, filed Jan. 20, 2012, the disclosure of which is incorporated by reference herein in its entirety. VBZ (e.g., vanadium, barium, zinc) based seal compositions are discussed in Ser. No. 13/354, 963, and may be used for the edge seal 4 and/or frit based tube seal 9 in certain example embodiments. Conventional solder glass frit material may also be used for the hermetic edge seal 4 and/or the frit based tube seal 9 in certain example embodiments. When using VBZ type seal compositions, a lower temperature sealing thermal profile is used to maintain the desired temper of the glass of the VIG unit because VBZ compositions have a lower firing temperature (e.g., <250° C.) than certain other conventional glass frit compositions that may be used to form seals in VIG units. It will be understood that the embodiments disclosed herein are equally applicable to VIG configurations using any suitable seal material.

In certain embodiments, the transparent glass substrates 2, 3 may be approximately the same size. However, in certain other example embodiments, one glass substrate 2 may be larger than the other 3 to provide, for example, an approximately L-shaped step proximate an edge of the VIG unit. One or both of the glass substrates 2, 3 may also optionally include at least one coating material (not shown) such as, for example, and without limitation, a low-E coating. It will be understood that various coatings may be present on an interior surface of at least one of the glass substrates 2, 3, and that such coatings provide various beneficial performance characteristics to the VIG window unit 1. In certain example embodiments, a low-E coating for blocking IR radiation is provided on the interior surface 3a of substrate 3 (as opposed to substrate 2 which supports the getter(s)). In certain example embodiments, the VIG window unit has a visible transmission of at least about 30%, more preferably of at least about 40%, even more preferably of at least about 50%, and even more preferably of at least about 60% or 70%.

An array of support pillars/spacers 5 is located between the glass substrates 2, 3 to maintain the spacing of the substrates in view of the lower than atmospheric pressure that is ultimately provided in low pressure evacuated cavity/space 6 between the substrates 2, 3. In certain example embodiments, the spacers may have a height, for example, of about 0.1 to 1.0 mm, more preferably from about 0.2 to 0.4 mm The height of the spacers 5 may approximately define the height of the vacuum/evacuated cavity 6. As noted above, the spacers 5 are preferably of a size that is sufficiently small so as to be visibly unobtrusive. According to certain example embodiments, the spacers 5 may be made of or include solder glass, glass, ceramic, metal, polymer, or any other suitable material. Additionally, the spacers 5 may be, for example, generally cylindrical, round, spherical, dime-shaped, C-shaped, pillow-shaped or any other suitable shape.

A pump-out tube 8, that may be hermetically sealed for example using solder glass 9, is provided through a hole 22 in one of the glass substrates, e.g., substrate 3. The pump-out tube 8 is used in a process to evacuate the cavity 6 between the substrates 2, 3, such as, for example, by attaching a vacuum pump to the distal end of pump-out tube 8 and evacuating the cavity 6 to a low pressure, e.g., a pressure lower than atmospheric pressure. Alternatively, the cavity may be evacuated in a low-pressure chamber. In a preferred example, a pressure in the cavity 6 following evacuation is, for example, preferably below about $10^{-2}$ Torr, and more preferably below about $10^{-3}$ Torr, and even more preferably below about $5 \times 10^{-4}$ Torr. During the evacuation process, the VIG unit may be subject to heating to help with the evacuating process, e.g., temperature(s) from about 150-300 degrees C. After evacuating the cavity 6, the pump-out tube 8 may be sealed, for example, by melting the tip 8a of the tube 8 by any suitable means, such as, for example, by laser. According to certain example embodiments, the pump-out tube 8 may or may not fully extend through the hole 22 to be flush with the interior surface 3a of the glass substrate 3, and may be left just short of the interior surface 3a by a distance of, for example, and without limitation, up to about up to 0.1 mm from the interior surface 3a in certain example embodiments.

After the pillars/spacers 5 are positioned on bottom glass substrate 2, at least one getter (e.g., EG type) 32 is positioned in getter recess 14. Then, the edge seal material is deposited on substrate 2. The other substrate 3 is brought down on substrate 2 so as to sandwich spacers/pillars 5, the glass frit solution, and getter 32 between the two substrates 2, 3. The assembly including the glass substrates 2, 3, the spacers/pillars 5, getter 32, and the edge seal material is then heated to a temperature (e.g., of at least about 500° C.) at which point the edge seal material melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. To maintain the low pressure in the space/cavity 6, substrates 2, 3 are hermetically sealed via edge seal 4, and the small spacers/pillars 5 are provided between the substrates to maintain separation of the approximately parallel substrates against atmospheric pressure. Once the space 6 between substrates 2, 3 is evacuated, the pump-out tube 8 may be sealed, for example, by melting its tip using a laser or the like. After evacuation of the cavity/space 6 to a pressure less than atmospheric, sealing of the pump-out tube may be accomplished by heating an end 8a of the pump-out tube 8 to melt the opening and thus seal the cavity of the VIG window unit. For example and without limitation, this heating and melting may be accomplished by laser irradiation of the tip 8a of the pump-out tube 8.

In various embodiments herein, the substrates 2 and/or 3 of or including glass may be from about 1-6 mm thick, more preferably from about 3-5 mm thick, with an example glass thickness being about 4 mm. In various embodiments herein, recess 14 may have a depth of from about 1.5 to 2.5 mm, with an example recess depth being about 2 mm in an example 4 mm thick sheet of glass. In certain example embodiments of forming the substrates 2 and 3, the getter recess(es) 14 is/are formed in one of the respective glass sheets, then the glass sheets may optionally be thermally tempered, then optionally a low-E coating may be provided on an interior surface of one of the substrates, then the two substrates 2, 3 (including any low-E coating, not shown) may be brought together around edge seal material and spacers as discussed herein during the VIG formation process.

Figure 4:
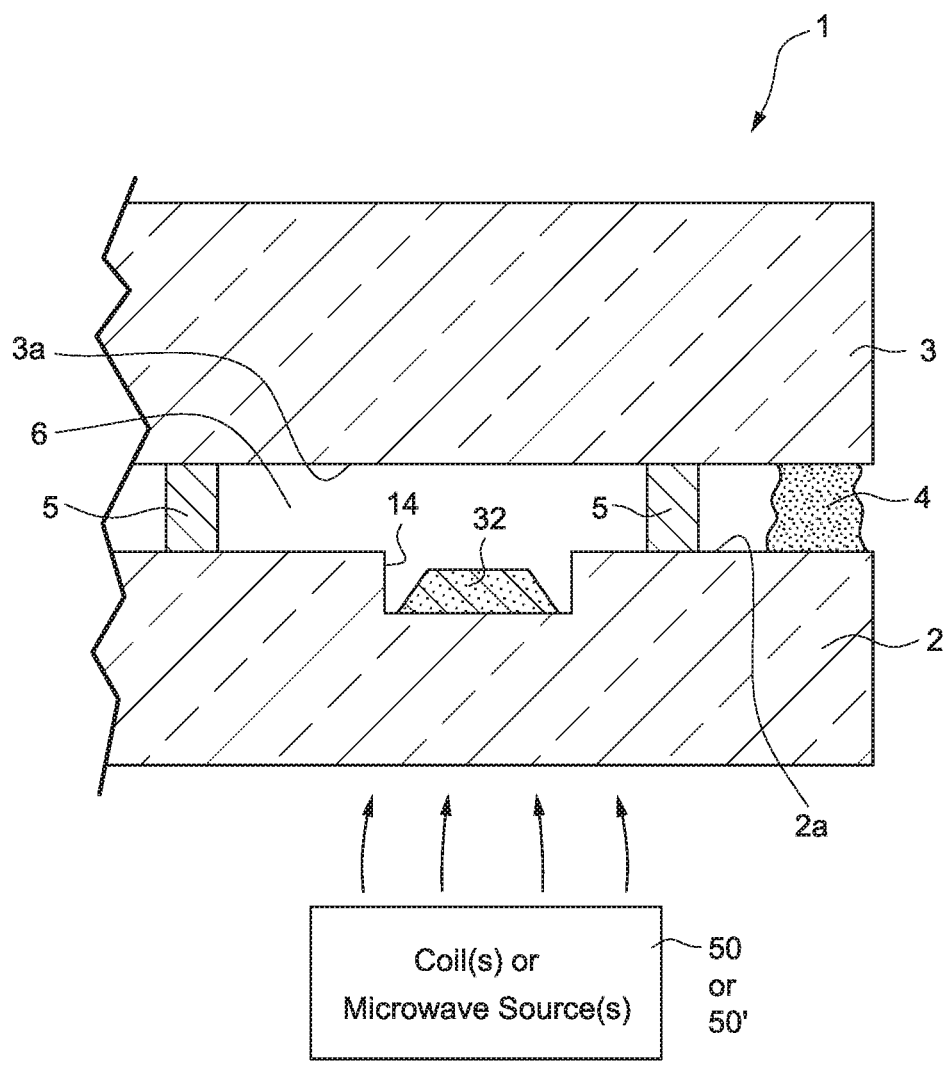
FIG. 4 is a schematic partial cross sectional diagram illustrating an example VIG window unit and a technique for activating a getter according to another example embodiment of this invention.

Referring to FIGS. 3-4, during the evacuation process when the pressure of cavity/space 6 is being lowered, the VIG unit is subjected to heating to help with the evacuating process, e.g., heated to and/or in temperature(s) from about 150-300 degrees C. Certain example embodiments of this invention relate to activating the getter(s) 32 during and/or at the end of the evacuation process. Thus, one or more getters 32 are activated during and/or at the end of the VIG pump out process. This is beneficial, for example, for getters including NEG type getter material as such getters typically need to be heated for some period of time to become activated (e.g., from about 350-500 degrees C. for about 5-15 minutes, with an example being at about 400 degrees C. for about 10 minutes). Because the VIG unit is already heated (e.g., to about 150-300 degrees C.) due to the heating used in the pump-out evacuation process, the energy and time needed to activate the getter 32 can be reduced by performing the activation during the evacuation process. Moreover, if conducted during the evacuation process, all or a portion of the time required for activation can overlap time required for evacuation (e.g., from about 3-12 minutes), thereby reducing the time needed to make the VIG window unit. By carrying out both evacuation and getter activation in overlapping manners (i.e., at least partially at the same time), throughput of an inline fabrication process of fixed length and line speed can be increased.

Getter 32 absorbs and/or binds with certain residual impurities (e.g., undesirable gases such as $CO_2$ and $N_2$) that may remain and/or are present in the cavity 6 during and/or after evacuation. The getter 32 may be located in a getter container in the getter recess 14, or alternatively may be deposited or located directly on the substrate 2 in different example embodiments of this invention. Getter 32, for purposes of simplicity, is illustrated as-deposited in non-activated form. Getters are typically subdivided into two main classes: evaporable getters (EGs) and non-evaporable getters (NEGs). EGs often include one or more alkaline earth metal(s) calcium, strontium, and/or especially barium. NEGs often include titanium, zirconium, or alloys thereof with one or more metals selected amongst aluminum and metal(s) of the first transition row. Both getter types, EGs and NEGs, require activation by heating for their operation to remove from the getter surface various oxides, carbides, and/or nitrides that otherwise inhibit the gaseous species to be removed from being sorbed on the getter's surface. Because of their high reactivity toward atmospheric gases, getters are typically made and transported in inactive form and require a suitable activating (e.g., flashing) heat treatment once they are arranged in the space to be evacuated. The getter 32 in the FIG. 3 and FIG. 4 embodiments may be an EG type getter or an NEG type getter. Alternatively, in certain example embodiments of this invention, the getter 32 may be a hybrid getter including both EG and NEG material.

Getter 32 can be provided below the pump-out tube 8 and at least partially in getter recess 14 in the glass substrate 2 as shown in FIG. 3, being deposited in solid form, so as to enable the laser beam to heat the getter through the tube 8. The location below the pump-out tube 8 is also advantageous because it allows for more scattering of the getter material during activation/flashing (e.g., in the case of EG) thereby resulting in more active getter surface area.

In the FIG. 3 embodiment, during and/or at the end of the evacuation process, a laser 30 (e.g., YAG laser) used to seal the tip of the pump-out tube 8 can also be used to heat the getter(s) in order to activate the getter(s) 32. The tip-off laser 30 can be used to further heat the getter 32 from the elevated evacuation temperature to its activation temperature. The laser can be aimed through the bore of the pump-out tube 8 so that the laser beam 31 emitted from the laser 30 goes through the tube 8 and hits the getter 32 in order to further heat the getter to activation temperature(s). The laser beam 31 may be directed through the pump-out tube 8 toward the getter 32 when the VIG unit is located in a vacuum chamber (not shown) so that the pressure in the cavity 6 does not significantly rise when the laser beam is being directed toward the getter for getter activation. As can be seen in the FIG. 3 embodiment, the getter 32 can be located substantially directly below the pump-out tube 8. At elevated temperature(s), contaminants on the surface of a NEG type getter diffuse into the bulk of the getter producing fresh reactive getter surface material for gettering undesirable gas(s) in cavity 6. By creating cracks in an NEG type getter, residual gas(es) in the cavity 6 gain passage to the getter core or interior whereby they are trapped and/or absorbed. Though the exposure area where the laser beam exposes the getter 32 may be a fraction of the getter size, most or all of NEG type getters 32 can be heated gradually through internal heat conduction in such a manner in order to cause getter activation, and/or the laser can be used to shock heat the getter thereby creating cracks therein to exposure gettering surface area; and regarding EG type getters when the spot hit by the laser exceeds the threshold temperature the exothermic reaction starts for the EG material and heats the EG to the point where getterable components (e.g., Ba, Ca and/or Sr) are evaporated and deposited upon adjacent surface(s). After the getter 32 has been activated (e.g., flashed) by the laser beam from laser 30, the same laser can be used to seal (tip-off) the top of the pump-out tube 8. In certain example embodiments, the laser beam 31 impinges upon the getter 32 for from about 2-15 seconds, more preferably from about 3-10 seconds, in order to activate the getter 32, and thereafter impinges upon the tip 8a of the pump-out tube 8 for from about 20-30 seconds in order to seal off the tip of the tube thereby sealing the cavity 6. The same laser power may be used in both getter activation and tube tip-off in certain example embodiments. Example tip-off techniques for sealing off the top of the tube 8 via laser are described in U.S. Ser. No. 13/474,819, filed May 18, 2012, the entire disclosure of which is hereby incorporated herein by reference.

Upon heating, activation for an EG type getter 32 includes evaporation of the metal (e.g., barium) onto the inner surfaces of the VIG unit, including onto the vertical, rounded or tilted sidewalls of recess 14 and/or onto the inner major surfaces of substrates 2, 3, and possibly into part of tube 8. Barium evaporation can be carried out by heating the EG 32 in accordance with the FIG. 3 or FIG. 4 embodiments, e.g., via laser through the pump-out tube 8, and/or from outside the VIG unit by exposing the EG to RF radiation from a coil and/or to microwave radiation. For example, when the EG composition of the getter includes $BaAl_4$ and Ni for example, exposure of the getter material to the laser and/or radiation for activation causes an increase in temperature of the powders to about 800-850 degrees C. At these temperatures, an exothermic reaction takes place between $BaAl_4$ and Ni, that causes a further rise in temperature to about 1100-1200 degrees C., at which temperature barium from the EG evaporates. The metal condenses in the form of a film on the adjacent inner surfaces of the VIG unit according to a so-called flash phenomenon, with the evaporated barium inclusive film being an active element in the gettering of undesired gases from the evacuated cavity 6. Thus, activation of the EG 32 causes the getter material to scatter to and become evaporated on adjacent areas inside the VIG unit via evaporation thereby increasing the surface area of gettering material. Thus, following activation/flashing, evaporated getter material is provided on the vertical, rounded or tilted sidewalls of getter recess 14 and/or on the inner major surface(s) of substrates 2 and/or 3 proximate the recess 14, and possibly into part of tube 8 and/or the sidewall of the hole for the tube 8.

An EG type getter 32 may be made of any suitable material that functions as an evaporable getter. Such materials include, but are not limited to, compounds comprising an element(s) chosen from among calcium, strontium, and barium. Preferably such compounds are in the form to limit the reactivity of these elements to air. An example useful EG material for a getter is an intermetallic compound $BaAl_4$, which further may be admixed with nickel powder and possibly small quantities of one or more of Al, Fe, Ti and/or their alloys. Other EG materials will be familiar to those of skill in the art. Activation causes the evaporated getter material to form in and/or adjacent the recess 14, with evaporated getter material being the getter material that is present (e.g., present in/on one or more of: getter recess sidewall(s), getter recess, interior major surface(s) of one or both substrates proximate the getter recess, and/or pump-out tube recess and/or tube itself) following activation and/or flashing of getter that included EG type material.

Non-evaporable getter (NEG) material can also be used for getter 32 in FIGS. 3-4, and can be any material known to those of skill in the art to function as a non-evaporable getter. For example, such NEG materials can include alloys comprising zirconium (Zr), titanium (Ti), or mixtures thereof, and at least one other element chosen from among vanadium (V), chromium (Cr), manganese (Mn), iron (Fe), cobalt (Co), nickel (Ni), aluminum (Al), niobium (Nb), tantalum (Ta), and tungsten (W). In certain example embodiments, zirconium-based alloys may be used, such as the binary alloys Zr—Al, Zr—Fe, Zr—Ni, Zr—Co, or the ternary alloys Zr—V—Fe and Zr—Mn—Fe. For example, NEG getters such as those commercially sold by SAES Getters, based in Italy, under tradenames St 101 and St 707. Another example NEG getter material which may be used has a percentage weight composition of substantially Zr 76.6%-Fe 23.4%, or Zr 75.7%-Ni 24.3%. Activation of an NEG 32, in accordance with FIG. 3 and/or FIG. 4, can substantially remove and/or interrupt the thin layer of oxides, carbides and/or nitrides that accumulates on the surface of the NEG material when the material is exposed to air. Activation, e.g., via laser and/or microwave, allows these species to migrate towards the getter particle core for NEG material, thereby exposing a metal or substantially metal surface which is active in gas chemisorption. The activation temperature for NEG material depends on the NEG composition, and can vary from about 350 degrees C. for an alloy having a weight composition of substantially 70% Zr, 24.6% V, 5.4% Fe, to about 900 degrees C. for an alloy characterized by 84% Zr, 16% Al.

This invention is not limited to activating the getter 32 by a laser beam aimed through the pump-out tube as shown in FIG. 3. In other example embodiments (e.g., see FIG. 4), the getter(s) 32 can be activated using other techniques during and/or at the end of the evacuation process, including but not limited to (i) via a laser beam that is emitted from a laser and proceeds through one of the glass substrates before hitting the getter, where such laser beam does not proceed though the length of the pump-out tube, (ii) by localized microwave heating via a microwave source located outside the VIG unit, and/or (iii) by localized RF-inductive heating from a coil located outside the VIG unit. These techniques (i)-(iii) for heating the getter 32 to activation temperature(s)/point are particularly useful when the getter(s) 32 is not located directly under the pump-out tube 8. As explained above, these techniques are preferably performed during and/or at the end of the evacuation (e.g., pump-out) process for the reasons explained above. FIG. 4 illustrates several such embodiments. FIG. 4 is the same as FIG. 3, except that in the FIG. 4 embodiment the getter 32 is activated by heating due to one or both of (a) by localized microwave heating via a microwave source 50 located outside the VIG unit, and/or (b) by localized RF-inductive heating from a coil 50' located outside the VIG unit.

When the getter activation is performed in parallel to the evacuation (e.g., pump-out) process, the activation of the getter 32 (whether by laser, induction or microwave heating) can be sequenced so that the getter is not significantly further poisoned by residual gases in the cavity 6. When gradually heated, the technique may be designed so that the getter 32 does not exceed the temperature at which it begins to sorp (which temperature depends on the getter composition) during evacuation (e.g., pump-out) before the pressure drops to or below about $1 \times 10^{-2}$ to $1 \times 10^{-3}$ mbar. When shock heating is used to produce cracks in a getter including NEG material, the pressure in the cavity 6 should be close to the minimum pressure achieved during evacuation (e.g., pump-out), such as less than or equal to about $1 \times 10^{-3}$ mbar, before the shock heating is designed to produce the cracks.

Producing cracks in the getter 32 for the purpose of exposing reactive bulk material for gettering may be facilitated by incorporating high expansion material within the bulk of the getter in certain example embodiments. The high expansion material could be a gas, liquid, or high CTE solid. Liquids or solids with transitions to high expansion phases occurring above the highest processing temperature (e.g., frit firing) may be used.

In certain example embodiments of this invention, there is provided a method of making a vacuum insulated glass (VIG) window unit, the method comprising: having first and second substantially parallel glass substrates, a plurality of spacers and a seal provided between the first and second substrates, and a cavity to be evacuated to a pressure less than atmospheric pressure located between the glass substrates, and a getter supported (directly or indirectly) by the first substrate; and directing a laser beam (focused, non-focused, or parallel) through a pump-out tube supported (directly or indirectly) by the second substrate so that the laser beam impinges upon the getter and activates the getter.

In the method of the immediately preceding paragraph, said directing the laser beam through the pump-out tube to activate the getter may be performed during and/or substantially at an end of an evacuation process in which the cavity is evacuated to a pressure less than atmospheric pressure.

In the method of any of the preceding two paragraphs, said directing the laser beam through the pump-out tube to activate the getter may be performed at least during an evacuation process in which the cavity is evacuated to a pressure less than atmospheric pressure.

In the method of any of the preceding three paragraphs, said directing the laser beam through the pump-out tube to activate the getter may be performed at least substantially at an end of an evacuation process in which the cavity is evacuated to a pressure less than atmospheric pressure.

In the method of any of the preceding four paragraphs, said directing the laser beam through the pump-out tube to activate the getter may be performed so that the getter does not exceed a temperature at which it begins to absorb undesirable gas(es) before pressure in the cavity drops to or below about $1\times10^{-2}$ to $1\times10^{-3}$ mbar during an evacuation process.

In the method of any of the preceding five paragraphs, said directing the laser beam through the pump-out tube to activate the getter may be performed after an evacuation process causes pressure in the cavity to reach less than or equal to about $1\times10^{-3}$ mbar.

In the method of any of the preceding six paragraphs, the getter may be located in a recess defined in the first substrate.

In the method of any of the preceding seven paragraphs, the getter may be located directly below the pump-out tube when the VIG unit is viewed in cross section.

In the method of any of the preceding eight paragraphs, the getter may comprise barium or including NEG material.

In the method of any of the preceding nine paragraphs, the VIG window unit may have a visible transmission of at least about 50%.

In certain example embodiments of this invention (e.g., see FIGS. 3-4), there is provided a method of making a vacuum insulated glass (VIG) window unit, the method comprising: having first and second substantially parallel glass substrates, an array of spacers and a seal provided between the first and second substrates, a cavity to be evacuated to a pressure less than atmospheric pressure located between the glass substrates, and at least one getter provided in the cavity; and activating the getter during and/or substantially at an end of an evacuation process in which the cavity is evacuated to a pressure less than atmospheric pressure.

In the method of the immediately preceding paragraph, said activating the getter may be performed at least during the evacuation process in which the cavity is evacuated to a pressure less than atmospheric pressure.

In the method of any of the preceding two paragraphs, said activating the getter may be performed at least substantially at an end of the evacuation process in which the cavity is evacuated to a pressure less than atmospheric pressure.

In the method of any of the preceding three paragraphs, said activating may comprise directing a laser beam through a pump-out tube supported by the second substrate so that the laser beam impinges upon the getter and activates the getter, where the getter is supported by the first substrate.

In the method of any of the preceding four paragraphs, said activating may comprise directing a laser beam at the getter in order to at least help activate the getter.

In the method of any of the preceding five paragraphs, said activating may comprise emitting microwave radiation from a microwave source toward the getter in order to at least help activate the getter.

In the method of any of the preceding six paragraphs, said activating may comprise emitting RF radiation from at least a coil toward the getter in order to at least help activate the getter.

In the method of any of the preceding seven paragraphs, said activating may be performed so that the getter does not exceed the temperature at which it begins to sorp before pressure in the cavity drops to or below about $1\times10^{-2}$ to $1\times10^{-3}$ mbar during an evacuation process.

In the method of any of the preceding eight paragraphs, said activating may be performed after an evacuation process causes pressure in the cavity to reach less than or equal to about $1\times10^{-3}$ mbar.

In the method of any of the preceding nine paragraphs, the getter may be located directly below a pump-out tube when the VIG unit is viewed in cross section.

In the method of any of the preceding ten paragraphs, the VIG window unit may have a visible transmission of at least about 50%.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A method of making a vacuum insulated glass (VIG) unit, the method comprising:
    having first and second glass substrates, a plurality of spacers and a seal provided between at least the first and second glass substrates, a cavity to be evacuated to a pressure less than atmospheric pressure located between at least the first and second glass substrates, and at least one getter provided in the cavity;
    activating the getter via at least radiation emitted from outside of the cavity, when the getter is provided in the cavity;
    wherein the cavity to be evacuated is located between the first and second glass substrates, and wherein a pump-out tube for evacuating the cavity extends in a direction substantially perpendicular to a major surface of at least one of the first and second glass substrates, and
    wherein the pump-out tube extends through at least part of one of the first and second glass substrates, the pump-out tube being elongated so that the pump-out tube has a length longer than its width.

2. The method of claim 1, wherein said activating the getter is performed at least during at least part of an evacuation process in which the cavity is evacuated to a pressure less than atmospheric pressure.

3. The method of claim 1, wherein said activating is performed after an evacuation process causes pressure in the cavity to reach less than or equal to about $1\times10^{-3}$ mbar.

4. The method of claim 1, wherein the getter is located directly below the pump-out tube when the VIG unit is viewed in cross section.

5. The method of claim 1, wherein the VIG unit has a visible transmission of at least about 50%.

6. The method of claim 1, wherein the pump-out tube extends through at least part of the first glass substrate, and wherein the getter is located on the second glass substrate.

7. The method of claim 1, wherein the pump-out tube extends through at least part of the first glass substrate, and wherein the getter is located in a recess defined in the second glass substrate.

8. The method of claim 1, wherein an elongated axis of the pump-out tube, extending from the pump-out tube, intersects the getter.

* * * * *